US005720266A

United States Patent [19]
Nogi et al.

[11] Patent Number: 5,720,266
[45] Date of Patent: Feb. 24, 1998

[54] CONTROL SYSTEM FOR A GASEOUS FUEL INTERNAL COMBUSTION ENGINE UTILIZING PID GAIN SCHEDULING PARAMETERS

[75] Inventors: Toshiharu Nogi, Hitachi-naka, Japan; George Saikalis, West Bloomfield, Mich.

[73] Assignee: Hitachi America, Ltd., Research and Development Division, Tarrytown, N.Y.

[21] Appl. No.: 707,321

[22] Filed: Sep. 3, 1996

[51] Int. Cl.$^6$ ............................................. F02D 41/00
[52] U.S. Cl. ............................................. 123/680
[58] Field of Search ................. 123/680; 340/933, 340/146.1 C; 342/44, 61; 141/94, 1, 219; 455/89, 56.1

[56] References Cited

U.S. PATENT DOCUMENTS

| | | | |
|---|---|---|---|
| 3,642,036 | 2/1972 | Ginsburgh et al. | 141/94 |
| 3,650,303 | 3/1972 | Chambers et al. | 141/1 |
| 3,670,303 | 6/1972 | Dame | 340/146.1 C |
| 4,182,989 | 1/1980 | Endo et al. | 340/93.3 |
| 4,838,295 | 6/1989 | Smith et al. | 137/9 |
| 5,249,612 | 10/1993 | Parks et al. | 141/219 |
| 5,294,931 | 3/1994 | Meir | 342/44 |
| 5,381,776 | 1/1995 | Matsubara et al. | 123/681 |
| 5,558,075 | 9/1996 | Maki et al. | 123/680 |
| 5,605,182 | 2/1997 | Oberrecht et al. | 141/94 |

*Primary Examiner*—Raymond A. Nelli
*Attorney, Agent, or Firm*—Gifford, Krass, Groh, Sprinkle, Patmore, Anderson & Citkowski, P.C.

[57] ABSTRACT

A fuel control system is provided for use with an internal combustion engine having at least one cylinder, a source of gaseous fuel and an intake passageway for fluidly connecting the air intake to the combustion cylinder. The control system includes a gas flow rate sensor which generates an output signal representative of the fuel flow rate to the engine as well as a mass air flow sensor which generates a signal representative of the mass air flow rate to the engine. A fuel valve is fluidly connected in series between the source of gaseous fuel and the air intake passageway. The fuel valve is actuated by an electrical pulse stream between an open and a closed position so that the duty cycle of the pulse stream is proportional to the amount of fuel supplied to the engine. In response to the fuel flow rate signal, the air flow rate signal and a target air/fuel ratio, the control system generates PID gain scheduling parameters relative to the duty cycle of the pulse stream. The system then varies the duty cycle of the pulse stream as a function of the PID gain scheduling parameters to obtain the target air/fuel ratio. Optionally, an air/fuel sensor generates an output signal representative of the actual air/fuel ratio supplied to the engine. This signal is compared to the target air/fuel ratio and utilized to generate second PID gain scheduling parameters to further modify the duty cycle of the pulse stream in order to obtain the target air/fuel ratio.

13 Claims, 9 Drawing Sheets

CONTROL SYSTEM FOR A GASEOUS FUEL INTERNAL COMBUSTION ENGINE UTILIZING PID GAIN SCHEDULING PARAMETERS

BACKGROUND OF THE INVENTION

I. Field of the Invention

The present invention relates generally to fuel control systems for internal combustion engines and, more particularly, to such a fuel control system for a gaseous fuel internal combustion engine. II. Description of the Prior Art In order to obtain optimum engine performance, modern day internal combustion engines of the type, for example, used in automotive vehicles, monitor the air/fuel ratio of the the charge to the engine and modify the air/fuel ratio by controlling the fuel supply to obtain the desired engine performance. Such monitoring of the air/fuel ratio is necessary not only to obtain the best fuel economy, but also to meet engine emission requirements typically dictated by government authority.

In order to maximize fuel economy and minimize engine emissions, there has been a modern trend to employ gaseous fuels, such as compressed natural gas (CNG), liquid natural gas (LNG) and liquid petroleum gas (LPG). Such gaseous fuels not only provide good fuel economy and low engine emissions, but also enjoy better cold starting of the engine.

There have been several previously known systems for monitoring the air/fuel ratio in a gaseous fuel internal combustion engine. In one system, an oxygen sensor is positioned in the exhaust stream from the engine and generates an output signal representative of the amount of oxygen in the exhaust gas stream. Since essentially all of the oxygen is utilized at stoichiometric conditions, the oxygen sensor senses the absence of oxygen and provides the appropriate signal to the electronic control unit (ECU) for the engine.

One disadvantage of this previously known type of fuel management system is that the oxygen sensor maintains its accuracy only at or very near stoichiometric combustion conditions. In many situations, however, it is desirable to operate the engine under a lean fuel condition for better fuel economy. The previously known fuel systems which utilize the oxygen sensor in the exhaust gas chamber, however, are not sufficiently accurate to monitor the air/fuel ratio to the engine during a lean combustion condition. Such inaccuracy, furthermore, is unacceptable in view of the continually increasingly stringent governmental regulations. Furthermore, such sensors lacked the durability to last as long as the engine was in service.

In a still different type of fuel management system of the type disclosed in U.S. Pat. No. 5,353,765 which issued Oct. 11, 1994 to Saikalis et al. and which is commonly owned by the assignee of this patent, a mass air flow sensor is positioned within the air intake to the engine and, similarly, a mass gas or fuel flow sensor is provided in the fuel supply passageway. Both the gas and fuel flow sensors provide output signals representative of the mass gas flow through the sensors to the ECU. The ECU then utilizes the input signals from both mass air flow sensor and mass fuel flow sensor to calculate the air/fuel ratio. The ECU then generates output signals to a fuel valve connected in series with the fuel supply passageway to control the amount of fuel provided to the engine. Since the ECU receives input signals representative of the mass fuel and mass air flow into the engine, theoretically the ECU is able to control the fuel flow into the engine in order to achieve any target air/fuel ratio.

In practice, however, such accurate control of the air/fuel ratio for the engine cannot be obtained for a variety of reasons.

With these previously known systems, in order to supply the gaseous fuel to the intake passageway, and thus to the engine, a fuel valve is fluidly connected in series between the source of gaseous fuel and the intake passageway. This valve is conventionally actuated by an electrical pulse stream such that the valve is open whenever the pulse stream is greater than a predetermined electrical value and otherwise closed. Consequently, by modifying the duty cycle of the pulse stream through pulse width modulation, a variable amount of fuel can be supplied to the engine.

One disadvantage of these previously known fuel valves, however, is that the fuel metering valves are not highly accurate and, as such, accurate air/fuel ratio control is difficult to achieve. As such, a given duty cycle for the fuel valve does not directly correspond to a predetermined fuel flow rate to the engine. There are many reasons for this including, inter alia, the pressure in the intake manifold. This pressure will, of course, vary for different engine operating conditions.

SUMMARY OF THE PRESENT INVENTION

The present invention provides a fuel control system for gaseous fuel engines which overcomes all of the above-mentioned disadvantages of the previously known devices.

In brief, in the present invention a mass air flow sensor is positioned within the air intake passageway to the engine while, similarly, a mass fuel or mass gas flow sensor is positioned in the fuel supply passageway between the source of compressed gaseous fuel and the air intake passageway. Both sensors, furthermore, provide output signals representative of the mass air or gas flow through the sensor to an electronic control unit (ECU).

In response to the input signals to the ECU, the ECU then generates output signals to a fuel valve positioned in series between the source of gaseous fuel and the air intake passageway to selectively control the amount of fuel provided to the engine and, thus, the air/fuel ratio of the engine combustible charge. The electronic control signal from the ECU to the fuel valve comprises an electrical pulse stream of a preset frequency, for example 500 hertz, such that the fuel valve is opened whenever the pulse stream exceeds a predetermined electrical level, e.g. a preset voltage, and is otherwise closed. Consequently, through pulse width modulation of the pulse stream which accordingly varies the duty cycle for the pulse stream, the amount of fuel supplied to the engine can be increased or decreased accordingly.

In order to vary the duty cycle of the pulse stream to the fuel valve, and thus the amount of fuel provided to the engine, the ECU determines the PID gain scheduling parameters relative to the duty cycle of the pulse stream necessary to obtain a target air/fuel ratio. These PID gain scheduling parameters are then utilized to modify a target duty cycle also determined by the ECU to vary the duty cycle of the pulse stream to thereby obtain the target air/fuel ratio. Preferably, the PID gain scheduling parameters are stored in look up tables contained in digital memory accessible by the ECU.

Optionally, the system includes an air/fuel ratio sensor which provides a signal to the ECU representative of the actual air/fuel ratio of the combustion charge. The ECU then determines a second set of PID gain scheduling parameters from look up tables contained in the digital memory as a function of the difference between the target air/fuel ratio and the actual air/fuel ratio. These second PID gain scheduling parameters in conjunction with the first mentioned PID gain scheduling parameters are utilized to modify the duty cycle of the pulse stream and thus the fuel flow rate to the engine.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
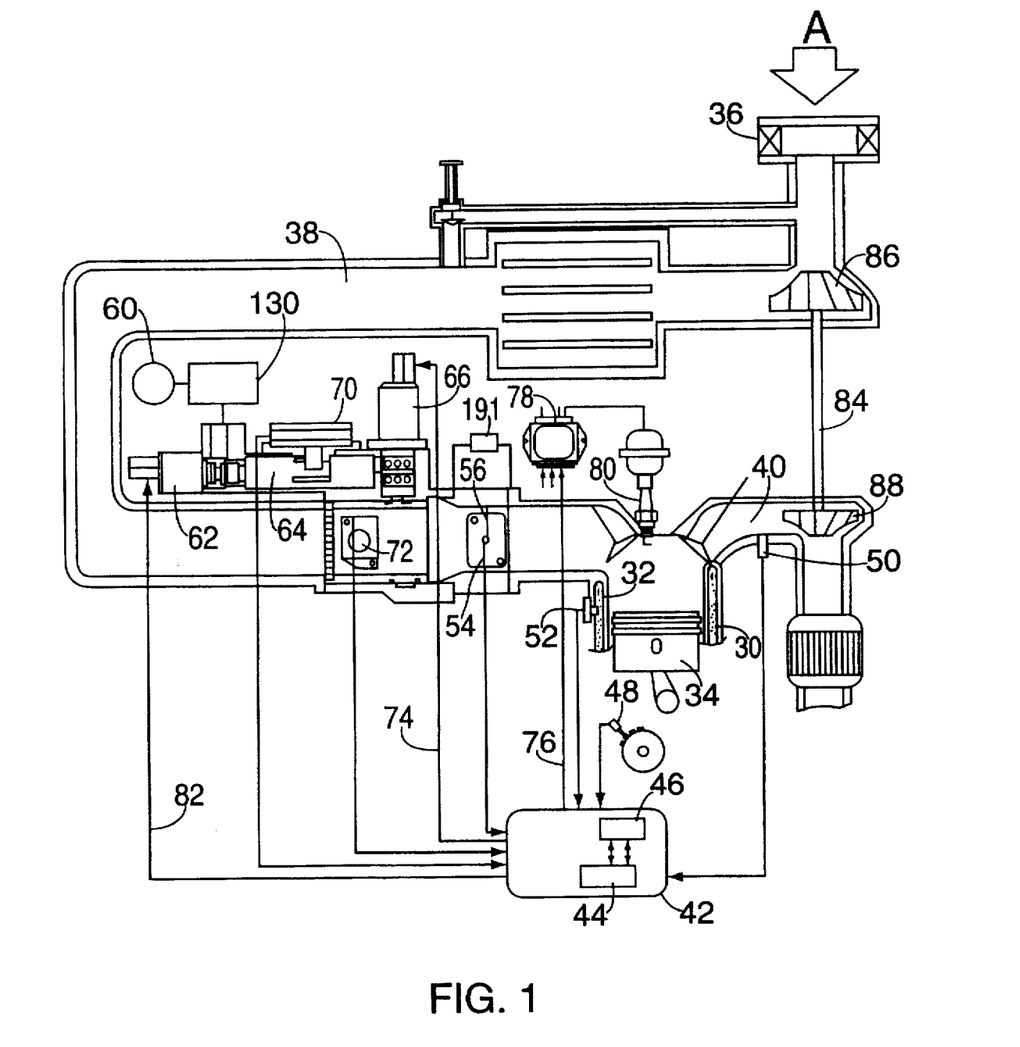
FIG. 1 is a schematic view illustrating a preferred embodiment of the fuel management system of the present invention.

With reference first to FIG. 1, a schematic view of a preferred embodiment of the fuel management system for a gaseous fuel engine 30 is there shown in which the engine 30 includes at least one cylinder 32 having a piston 34 reciprocally mounted within the cylinder 32. Air is inducted into the engine cylinder 32 through an air filter 36 and an air intake passageway 38. After combustion, the combustion products from the engine cylinder 32 are exhausted out through an exhaust passageway 40 in the conventional fashion.

The fuel management system includes an electronic control unit (ECU) 42 for controlling fuel delivery to the engine cylinder(s) 32 in a fashion hereinafter described in greater detail. The ECU 42 preferably includes a microprocessor 44 having access to computer memory 46 which not only contains the program to operate the microprocessor 44, but also random access memory to store variables during the execution of the program by the microprocessor 44.

The ECU 42 receives a plurality of input signals representative of various engine parameters. In particular, the ECU receives an input signal from a crank shaft rotational position sensor 48 which, of course, is indicative of the position of the piston(s) 34 in the engine cylinder(s) 32. The output from the sensor 48 can also be utilized by the ECU 42 to determine engine speed so that the sensor 48 also forms an rpm sensor.

The ECU 42 also receives as an input signal, the output signal from an oxygen sensor 50 which is positioned in the exhaust gas passageway 40. The oxygen sensor 50, furthermore, provides an output signal representative of the amount of oxygen in the exhaust gas stream flowing through the exhaust passageway 40. Furthermore, the oxygen sensor 50 generates a predetermined output signal, e.g. 500 millivolts, whenever the engine 30 achieves stoichiometric combustion.

A coolant temperature sensor 52 also provides an input signal to the ECU 42 representative of the temperature of the engine coolant. Likewise, a throttle position sensor 54 provides an input signal to the ECU 42 representative of the position of an engine throttle 56 which is positioned in series with the air intake passageway 38.

Still referring to FIG. 1, a source of pressurized gaseous fuel 60 is fluidly connected through a pressure regulator 130 and shut off valve 62 to a fuel supply passageway 64. A fuel metering valve 66 is provided in series between the fuel supply passageway 64 and the air intake 38. Thus, when the fuel metering valve 66 is open, fuel flows from the pressurized gaseous fuel source 60, through the passageway 64 and into the air intake 38 whereupon the fuel and air are intermixed together prior to introduction into the engine cylinders 32.

A mass gas or mass fuel flow sensor 70 is positioned within the fuel supply passageway 64 and provides an output signal to the ECU 42 representative of the mass of fuel flowing through the passageway 64 and thus flowing to the engine cylinder(s) 32. Similarly, a mass air flow sensor 72 is positioned within the air intake passageway 38 upstream from the outlet of the fuel metering valve 66 and generates an output signal to the ECU 42 representative of the mass air flow through the air intake 38 and thus the mass air flow to the engine 30.

The ECU 42 also generates a number of output signals necessary to control the fuel supply to the engine as well as the engine combustion. Ideally, the ECU 42 controls the fuel supplied to the engine at a target air/fuel ratio which maximizes fuel economy and minimizes the creation of noxious emissions while meeting engine performance criteria for different engine operating conditions.

In particular, the ECU 42 sends an output signal along line 74 to control the actuation of the fuel metering valve 66. Similarly, the ECU provides an output signal along line 76 to a spark ignition module 78 which in turn controls the firing of a spark plug 80 in the cylinder 32. The ECU 42 also controls the activation of the pressure regulator/shutoff valve 62 for the pressurized fuel source 60 via output line 82.

Still referring to FIG. 1, in the preferred embodiment of the invention, a turbocharger assembly 84 is provided for increasing the amount of air to the engine 30. The turbocharger assembly 84 includes a compressor fan 86 positioned within the air intake passageway 38 between the air intake 36 and the mass air flow sensor 72. In the conventional fashion, a driven fan 88 is positioned within the exhaust passageway 40 which rotatably drives the compressor fan 86.

In order to control the actuation of the fuel valve 66, the ECU 42 sends an electrical pulse stream to the fuel valve 66. Whenever the level or voltage of the pulse stream is greater than a predetermined amount, the valve is opened and vice versa.

Consequently, the duty cycle of the pulse stream on line 74 to the valve 66 controls the amount of opening or duty cycle of the fuel valve 66 and thus the amount of fuel that is supplied to the intake passageway 38 and ultimately to the engine cylinder 32. Preferably, the pulse stream has a predetermined frequency and is a square wave signal.

Consequently, pulse width modulation of the pulse stream varies the fuel flow rate to the engine.

Figure 2:
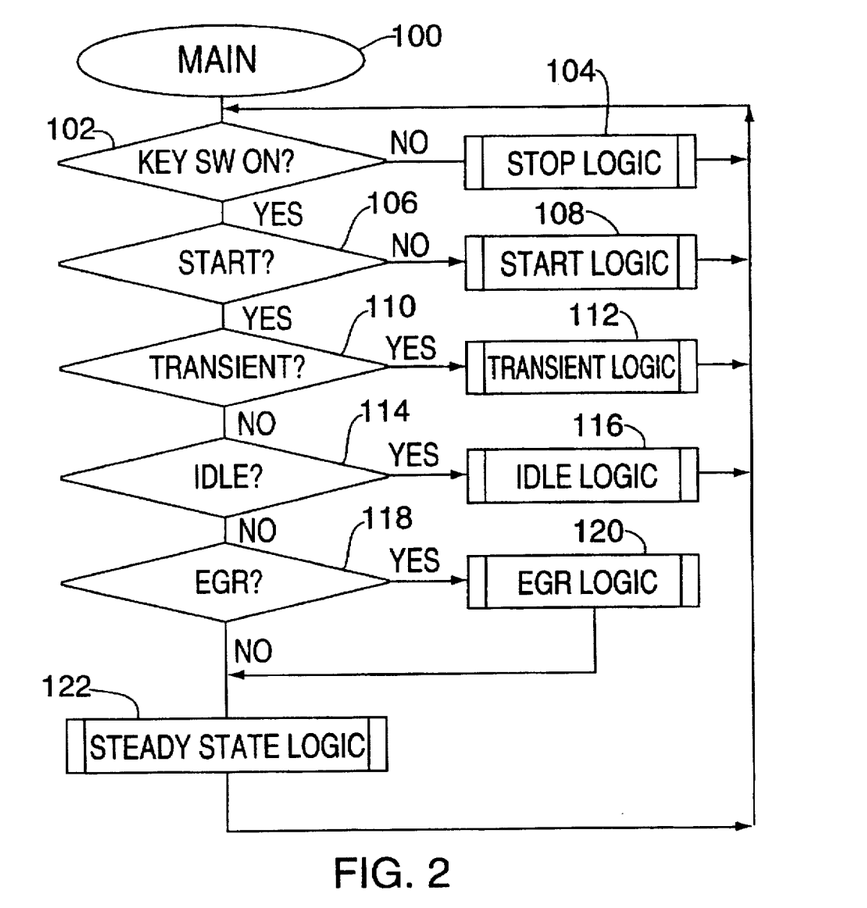
FIG. 2 is a flow chart illustrating the main loop for the preferred embodiment of the present invention.

With reference now to FIG. 2, a flow chart is there shown illustrating the main control loop for the microprocessor 44. The program begins execution at step 100 and immediately branches to step 102 in which the program determines if the ignition key is turned on. If not, step 102 branches to step 104 and executes the stop logic which will be subsequently described in greater detail.

Assuming that the switch is on, step 102 branches to step 106 which determines if the engine has started. If not, step 106 branches to step 108 and executes the start logic which will subsequently be described in greater detail.

Assuming that the engine is started, step 106 instead branches to step 110 which determines if a transient condition, such as an acceleration or deceleration condition, is currently exhibited by the engine. Such a transient condition can be detected, for example, by the ECU 42 from the throttle position sensor 54 in conjunction with the output from the sensor 48. If the engine is undergoing a transient condition, step 110 branches to step 112 and executes the transient condition logic hereafter described in greater detail.

Assuming that a transient condition is not present, step 110 instead branches to step 114 which determines if the engine is undergoing an idle condition as determined by the ECU from the throttle position sensor 54 and the sensor 48. If so, step 114 branches to step 116 which executes the idle logic condition which will be hereinafter described in greater detail.

Assuming that the engine is not in an idle condition, step 114 branches to step 118 which determines if the engine is in an exhaust gas recirculation (EGR) mode. If so, step 118 branches to step 120 which executes the EGR logic hereinafter described in greater detail.

Assuming that an EGR condition is not present, step 118 branches to step 122 which executes the steady state logic, e.g. a cruising condition, for the engine. The steady state logic will be subsequently described in greater detail.

Following execution of the stop logic at step 104, start logic at step 108, transient logic at step 112, idle logic at step 116 or steady state logic at step 122, the ECU branches to step 102 and continuously repeats the main control loop. Consequently, as can be seen from FIG. 2, the ECU continuously monitors the various engine sensors to determine the current engine operating condition. The engine then executes specialized logic for each of the different specified engine conditions in order to minimize emissions, maximize fuel efficiency and yet maintain performance as required.

Figure 3A:
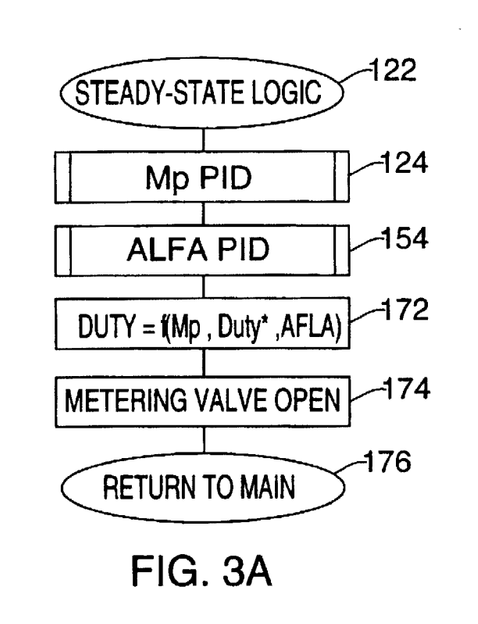
FIGS. 3A-3C are flow charts illustrating the engine control during a steady state engine operating condition.
Figure 3B:
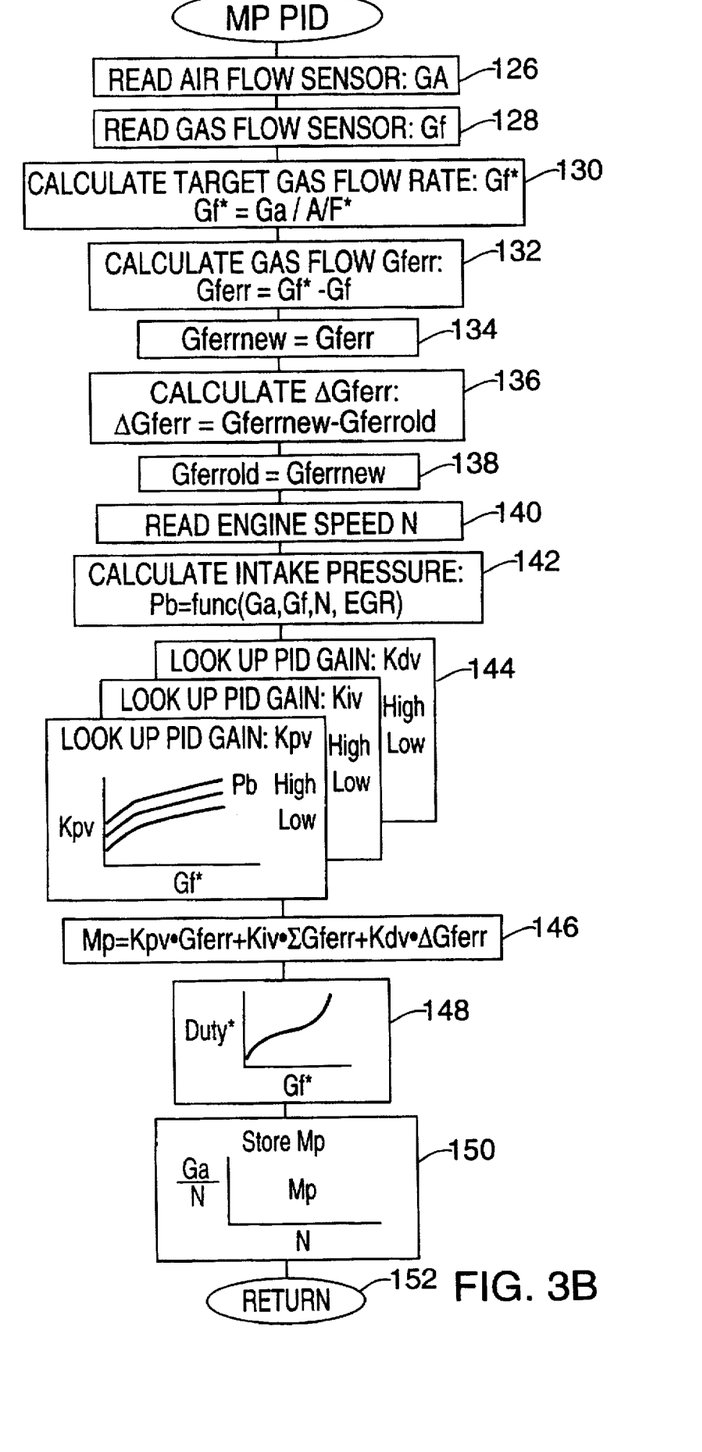

With reference now to FIG. 3A, the steady state logic step (step 122 in FIG. 2) is there shown in greater detail. At step 124, the program first determines the $M_p$ PID gain scheduling parameters illustrated in greater detail in FIG. 3B. In FIG. 3B, the ECU first reads the air flow sensor 72 at step 126 and generates an output signal $G_a$ representative of the mass air flow through the air intake passageway 38. Step 126 then branches to step 128.

At step 128, the program reads the mass gas or fuel flow sensor 70 (FIG. 1) and generates an output signal $G_f$ representative of the actual fuel flow rate through the sensor 70. This fuel flow rate which necessarily passes through the valve 66 flows into the air intake passageway 38 and becomes intermixed with the inducted air in the conventional fashion. Step 128 then branches to step 130.

At step 130 the program calculates a target gas flow rate $G_f^*$ in accordance with the following formula:

$$G_f^* = G_a / A/F^*$$

In calculating the target gas flow rate to the engine, the program utilizes a stored target value for the air/fuel ratio $A/F^*$. This target air/fuel ratio will be constant for a given engine operating condition, such as a steady state condition.

Step 130 then branches to step 132 which calculates the err signal $G_{ferr}$ for the fuel flow rate in accordance with the following formula:

$$G_{ferr} = G_f^* - G_f$$

The $G_{ferr}$ signal is then stored as the new $G_{ferr}$ signal in the constant $G_{fernew}$ at step 134 and then branches to step 136 in which the change in the fuel flow rate err signal $\Delta G_{ferr}$ is calculated in accordance with the following formula:

$$\Delta G_{ferr} = G_{fernew} - G_{ferrold}$$

The $G_{ferrold}$ signal is then updated with the $G_{fernew}$ signal at step 138 and the program then branches to step 140 whereupon the ECU 42 reads the engine speed N from the engine speed sensor 48. Step 140 then branches to step 142.

At step 142, the ECU computes the intake pressure $P_b$ in the intake passageway 38 in accordance with the following formula:

$$P_b = f(G_a, G_f, N, EGR)$$

where EGR=percentage of exhaust gas recirculation

After calculation of the intake pressure, step 142 branches to step 144 where the PID gain scheduling parameters $K_{dv}$, $K_{iv}$ and $K_{pv}$ are determined both as a function of the target gas flow rate $G_f^*$ but also of the intake pressure $P_b$.

Preferably, the values for $K_{dv}$, $K_{iv}$ and $K_{pv}$ are maintained in digital memory 46 accessible to the microprocessor 44 (FIG. 1) in the form of a look up table. Such look up tables are well known in the art so that a further description thereof is unnecessary.

Step 144 then branches to step 146 in which the proportional gain for the valve opening $M_p$ is determined utilizing the gas flow err signal $C_{ferr}$ in connection with the PID gain scheduling parameters determined at step 144 in accordance with the following formula:

$$M_p = K_{pv} * G_{ferr} + K_{iv} \Sigma G_{ferr} + K_{dv} \Delta G_{ferr}$$

Step 146 then branches to step 148 which refreshes the duty cycle for the fuel valve 66 and then to step 150 where the proportional gain $M_p$ is stored by the microprocessor 44 for a future engine startup. Step 150 then branches to step 152 which returns back to the main loop illustrated in FIG. 3A.

After computation of the $M_p$ value for the proportional gain, step 124 then branches to step 154 where the program calculates ALFA which are PID gain scheduling parameters based upon the actual air/fuel ratio of the combustion charge to the engine. The computation of the ALFA PID gain is scheduling parameters shown in greater detail in FIG. 3C.

Figure 3C:
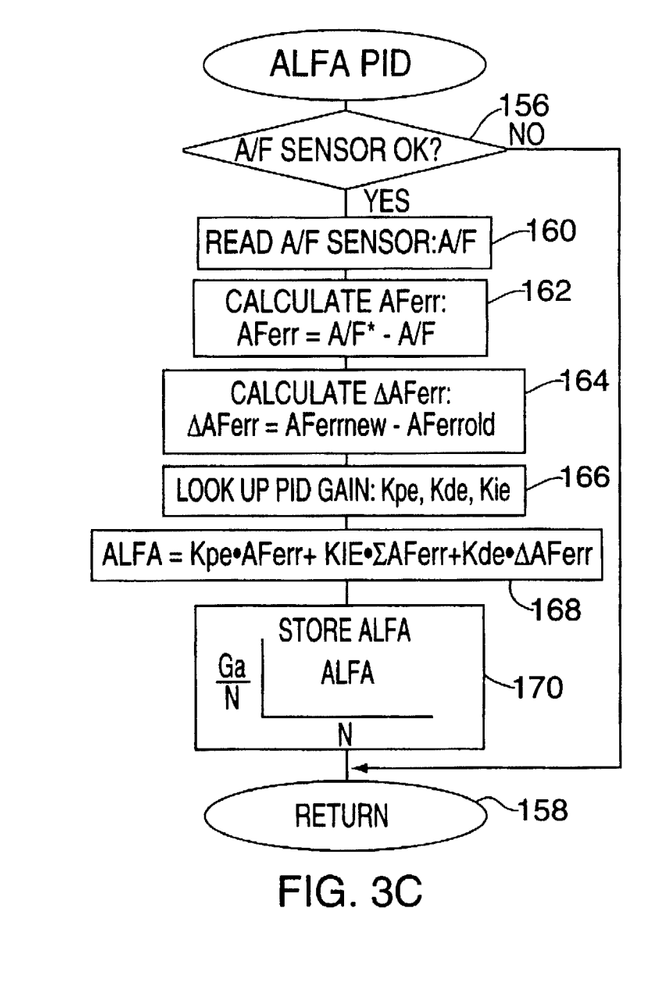

With reference then to FIG. 3C, at step 156 the program first determines if the air/fuel sensor 50 (FIG. 1) is operational. If not, step 156 branches to step 158 and returns.

Assuming that the air/fuel sensor 50 is operational, step 156 branches to step 160 where the ECU 42 reads the value from the air/fuel sensor 50 and stores its value as the air/fuel ratio A/F. Step 160 then branches to step 162.

At step 162, the ECU calculates the value of the air/fuel ratio err signal $AF_{err}$ by finding the difference between the target air/fuel ratio A/F* and the actual air/fuel ratio A/F in accordance with the following formula:

$$AF_{err}=A/F^*-A/F$$

Step 164 then branches to step 166 where the ECU determines the values for the second PID gain $K_{pe}$, $K_{de}$ and $K_{ie}$ which are preferably stored in a look up table in the same fashion as step 144 (FIG. 3B). Step 166 then branches to step 168 where the proportional gain for the valve opening ALFA is determined in accordance with the following formula:

$$ALFA=K_{pe}*AF_{err}+K_{ie}\Sigma AF_{err}+K_{de}\Delta AF_{err}$$

Step 168 then branches to step 170 which stores the determined value of ALFA and then returns via step 158.

With reference again to FIG. 3A, after the proportional gain $M_p$ for the valve opening at step 124 as well as the ALFA air/fuel ratio feedback signal at step 154, step 154 branches to step 172 where the duty cycle for the pulse stream to the valve 66 is determined as follows:

$$Duty=f(M_p,Duty^*,ALFA)$$

where Duty*=target duty cycle

The actual determination of the duty cycle may constitute a rather simple function of $M_p \times ALFA \times Duty^*$.

Step 172 then branches to step 174 where the ECU modifies the duty cycle for the pulse stream on line 74 to the valve 66 via pulse width modulation. Preferably, the frequency of the pulse stream to the valve 66 remains constant and the duty cycle modified only by varying the pulse width of the pulses in the pulse stream.

Step 174 then branches to step 176 which returns to the main event loop illustrated in FIG. 2.

Figure 4:
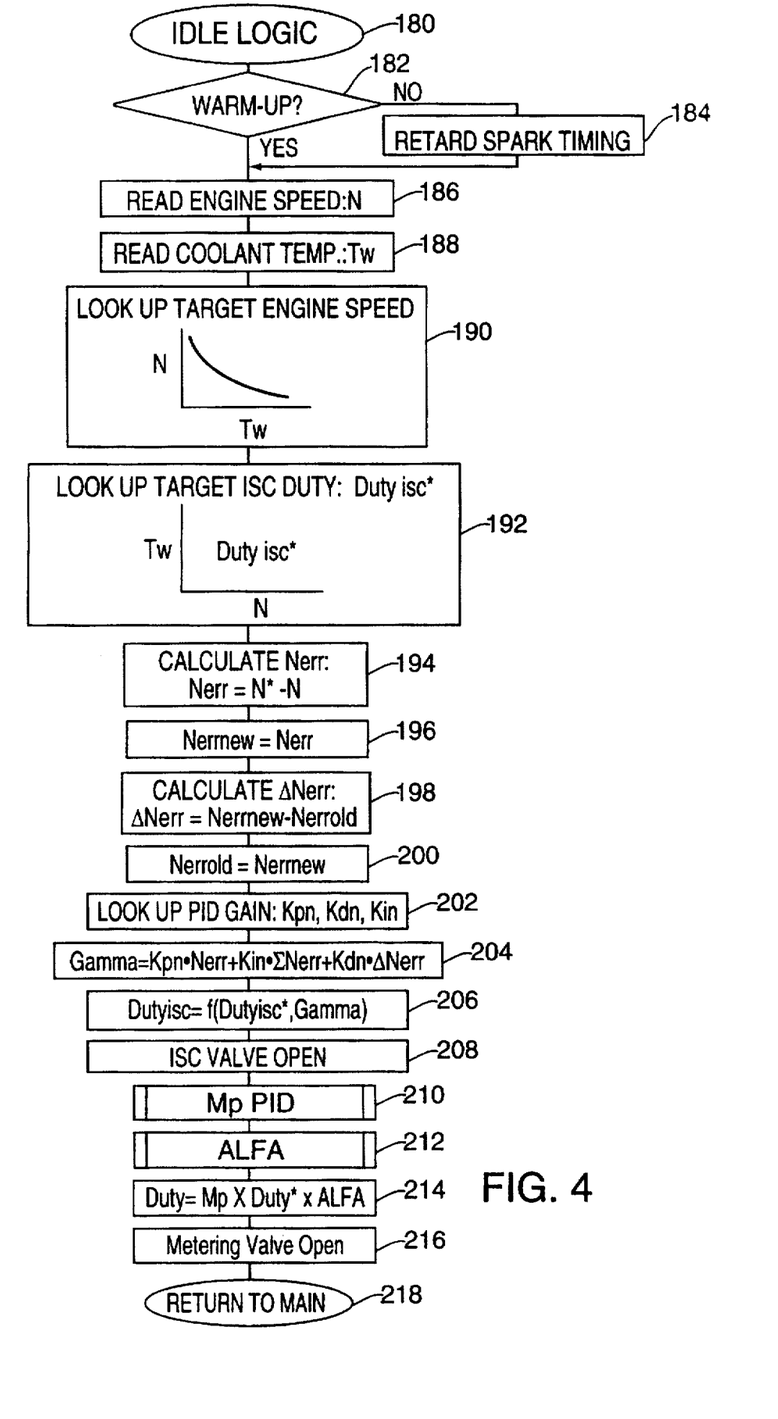
FIG. 4 is a flow chart illustrating the control strategy during an idle engine condition.

With reference now to FIG. 4, assuming that, instead of a steady engine operating condition, the engine is in an idle condition, step 114 branches to step 116 which is illustrated more fully in FIG. 4.

After entering the idle logic program at step 180, the ECU initially tests at step 182 if the engine is warm by testing the value of the temperature coolant sensor 52 (FIG. 1). If not, step 182 branches to step 184 and retards the spark timing by sending the appropriate signals on line 76 to the ignition system 78 (FIG. 1). Such retardation provides for faster engine warmup.

Conversely, if the engine is warm or after the spark timing has been retarded by step 184, step 182 branches to step 186 which reads the engine speed N from the engine sensor 48 and then to step 188 where the program reads the coolant temperature $T_w$. Step 188 then branches to step 190.

At step 190, the ECU 42 utilizes a look up value to determine the value of a target engine speed N* as a function of the coolant temperature $T_w$. Conventionally, a higher target engine speed is usually desirable for colder coolant temperatures.

Step 190 then branches to step 192 where the microprocessor utilizes a look up table to determine a target value for the duty cycle of the idle speed control valve 191 (FIG. 1) as a function of the engine coolant temperature $T_w$ and the engine speed N. Step 192 then branches to step 194.

At step 194, the ECU calculates the engine speed err signal $N_{err}$ in accordance with the following formula:

$$N_{err}=N^*-N$$

The ECU then stores the engine speed air signal $N_{err}$ as the new err signal $N_{ernew}$ at step 196 and then calculates the value $\Delta N_{err}$ as follows:

$$\Delta N_{err}=N_{ernew}-N_{errold}$$

and then stores the new err signal $N_{ernew}$ as the old err signal $N_{errold}$ at step 200.

Step 200 then branches to step 202 where the ECU determines the PID gain values $K_{pn}$, $K_{dn}$ and $K_{in}$ from look up tables in the fashion previously described. It will, of course, be understood that the PID gain values and the PID gain look up tables for a particular engine operating condition, such as an idle condition, will vary depending upon the engine operating condition.

Step 202 then branches to step 204 which calculates the gain correction value Gamma as follows:

$$Gamma=K_{pn}*N_{err}+K_{in}\Sigma N_{err}+K_{dn}\Delta N_{err}$$

After the gain correction value of Gamma has been calculated, step 204 branches to step 206 in which the duty cycle $Duty_{isc}$ for the idle speed control valve 191 is calculated as follows:

$$Duty_{isc}=f(Duty_{isc}^*, Gamma)$$

Step 206 then branches to step 208 which actuates the idle speed control valve in accordance with the duty cycle determined at step 206.

Step 208 then branches to step 210 which calculates the proportional gain $N_p$ for the valve 66 in the fashion previously described in FIG. 3B. The ECU then determines the value for ALFA at step 212 and then determines the duty cycle Duty as follows:

$$Duty=f(M_p,Duty^*,ALFA)$$

where Duty*=target duty cycle

Step 214 then branches to step 216 which varies the duty cycle of the pulse stream to the fuel valve 66 via pulse width modulation in the previously described fashion. Step 216 then branches to step 218 which returns to the main loop illustrated in FIG. 2.

Consequently, during an idle engine speed operating condition, i.e. a throttle closed position as determined from the throttle sensor 54 coupled with engine speed N below a predetermined rpm, the ECU first calculates a proportional gain correction value Gamma which is utilized to vary the opening of the idle speed control valve. Thereafter, the proportional gain $M_p$ and air/fuel ratio feedback direction ALFA are then computed in the previously described fashion.

Figure 5:
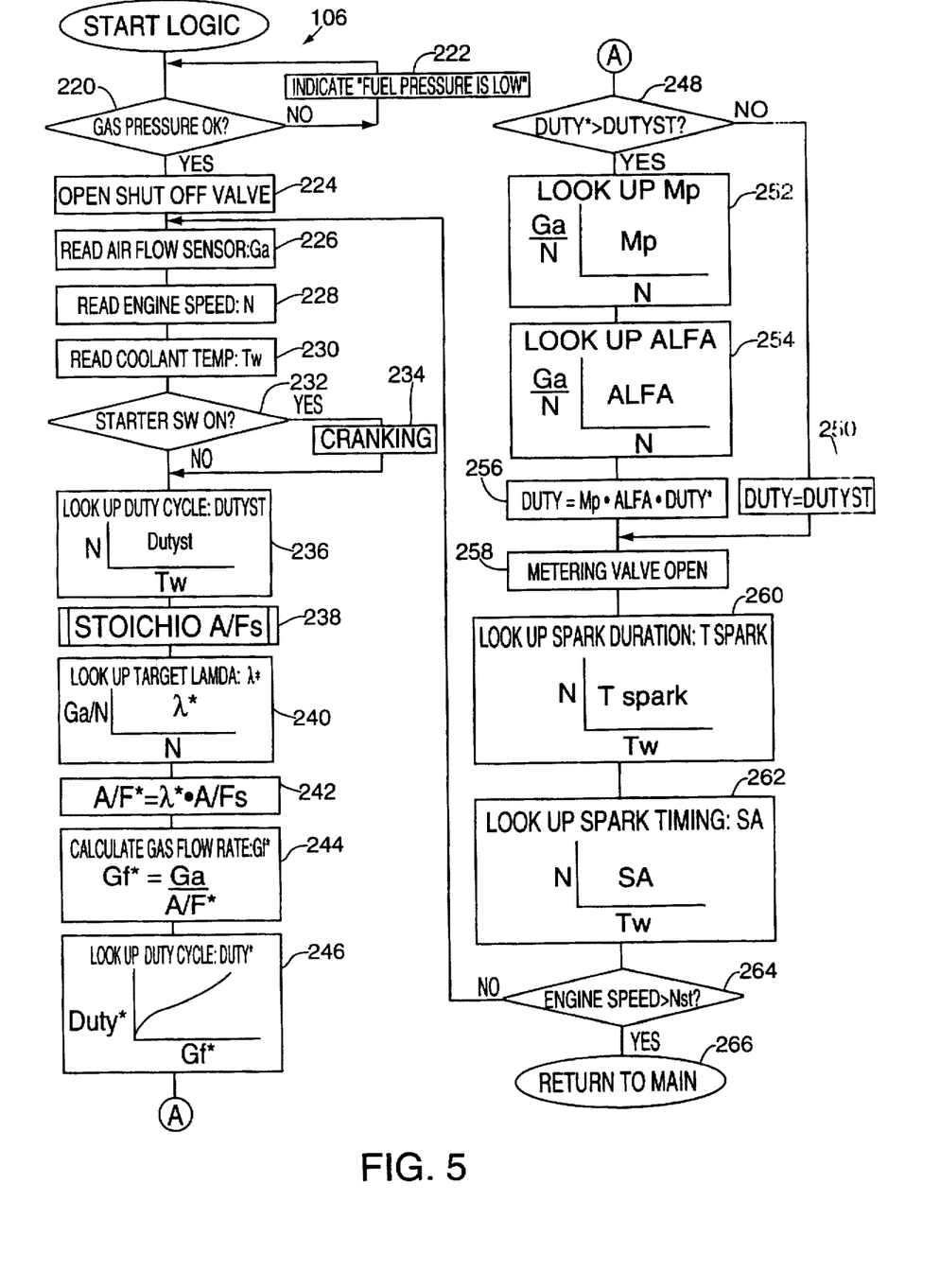
FIG. 5 is a flow chart illustrating the strategy during an engine start condition.

With reference now to FIG. 5, the flow chart for the start engine step 106 (FIG. 2) is there shown in greater detail. At step 220, the start logic first determines the gas pressure from the gas source 130 from the gas pressure sensor and then compares this value with a predetermined minimum amount. If the gas pressure is below the predetermined minimum amount, step 220 branches to step 222 which activates an indicator alarm and then prohibits engine starting.

Assuming that there is sufficient gas pressure from the gas source 60 as determined by the ECU 42 from the gas pressure transducer 130, step 220 branches to step 224 where the ECU 42 generates an output signal on line 82 (FIG. 1) to the fuel shutoff valve 62 in order to open the shutoff valve 62. Step 224 then branches to step 226.

At step 226, the ECU first determines the value of the mass air flow $G_a$ to the engine by reading the signal from the air flow sensor 72. The ECU then reads the engine speed N from the speed sensor 48 at step 228 and, finally, the coolant temperature $T_w$ from the sensor 52 at step 230. Step 230 then branches to step 232.

At step 232, the ECU determines if the starter switch is on. If so, step 232 branches to step 234 and initiates engine cranking. If the starter switch is not open or after engine cranking, step 232 or 234 then branches to step 236.

At step 236, the ECU utilizes a look up table to determine the duty cycle $Duty_{st}$ for the duty cycle of the pulse stream to the fuel valve 66 as a function of engine speed N and coolant temperature $T_w$. For example, it may be desirable to enrich the fuel charge to the engine at cold engine temperatures.

Step 236 then branches to step 238 where the ECU retrieves a constant value $A/F_s$ representative of the stoichiometric value for engine combustion. The value $A/F_s$ will be constant depending upon the type of gaseous fuel.

Step 238 then branches to step 240 where the ECU determines a target lambda $\lambda^*$ as a function of the engine load $G_a/N$ and engine speed N.

Step 240 then branches to step 242 where the target air fuel ratio $A/F^*$ is computed as follows:

$$A/F^* = \lambda^* \times A/F_s$$

The ECU then calculates the target gas flow rate $G_f^*$ at step 244 as follows:

$$G_f^* = \frac{G_a}{A/F^*}$$

Step 244 then branches to step 246 which determines the target duty cycle Duty* from the look up table as a function of the target gas flow rate $G_f^*$. It is desirable to obtain a target value Duty* for the duty cycle of the signal provided to the fuel valve 66 during an engine starting condition since the signals from the air flow sensor cannot be considered to be reliable during a low speed engine cranking condition. Step 246 then branches to step 248.

At step 248, the ECU determines if the target duty cycle Duty* is greater than the duty cycle $Duty_{st}$ as determined at step 236. If not, step 248 branches to step 250 which sets the duty cycle Duty equal to the larger value $Duty_{st}$ since the value Duty* would otherwise be considered unreliable. Consequently, by selecting a value of the duty cycle both as a function of engine speed and coolant temperature at step 236, as well as a function of the target gas flow rate at step 248, and then selecting the larger of the two to determine the actual duty cycle of the pulse stream to the fuel control valve 66, adequate fuel flow to the engine is ensured during an engine starting condition.

Assuming that the target duty cycle Duty* determined at step 246 is greater than the duty cycle $Duty_{st}$ determined at step 236, step 248 branches to step 252 in which the proportional gain for the valve opening $M_p$ as determined from a look up table as a function of the engine load $G_a/N$ and engine speed N. The ECU then determines the feedback signal ALFA at step 254 also as a function of engine load $G_a/N$ and engine speed N. The duty cycle of the pulse stream to the fuel valve 66 is then determined at step 256 by the ECU as a function of $M_p$, ALFA and Duty*. Step 256 then branches to step 258 and actuates the valve 66 by varying the pulse stream to the valve 66 to have the duty cycle determined at step 256.

Step 258 then branches to step 260 which determines the value of spark duration from a look up table as a function of engine speed N and coolant temperature $T_w$. Step 262 then determines the spark timing SA from a look up table as a function of engine speed N and coolant temperature and then branches to step 264.

At step 264, the ECU determines if the engine speed N exceeds a predetermined constant $N_{st}$ indicative of engine starting. If not, step 264 branches back to step 226 and the above process is repeated. Otherwise, step 264 branches to step 266 and returns to the main operating loop (FIG. 2).

Figure 6:
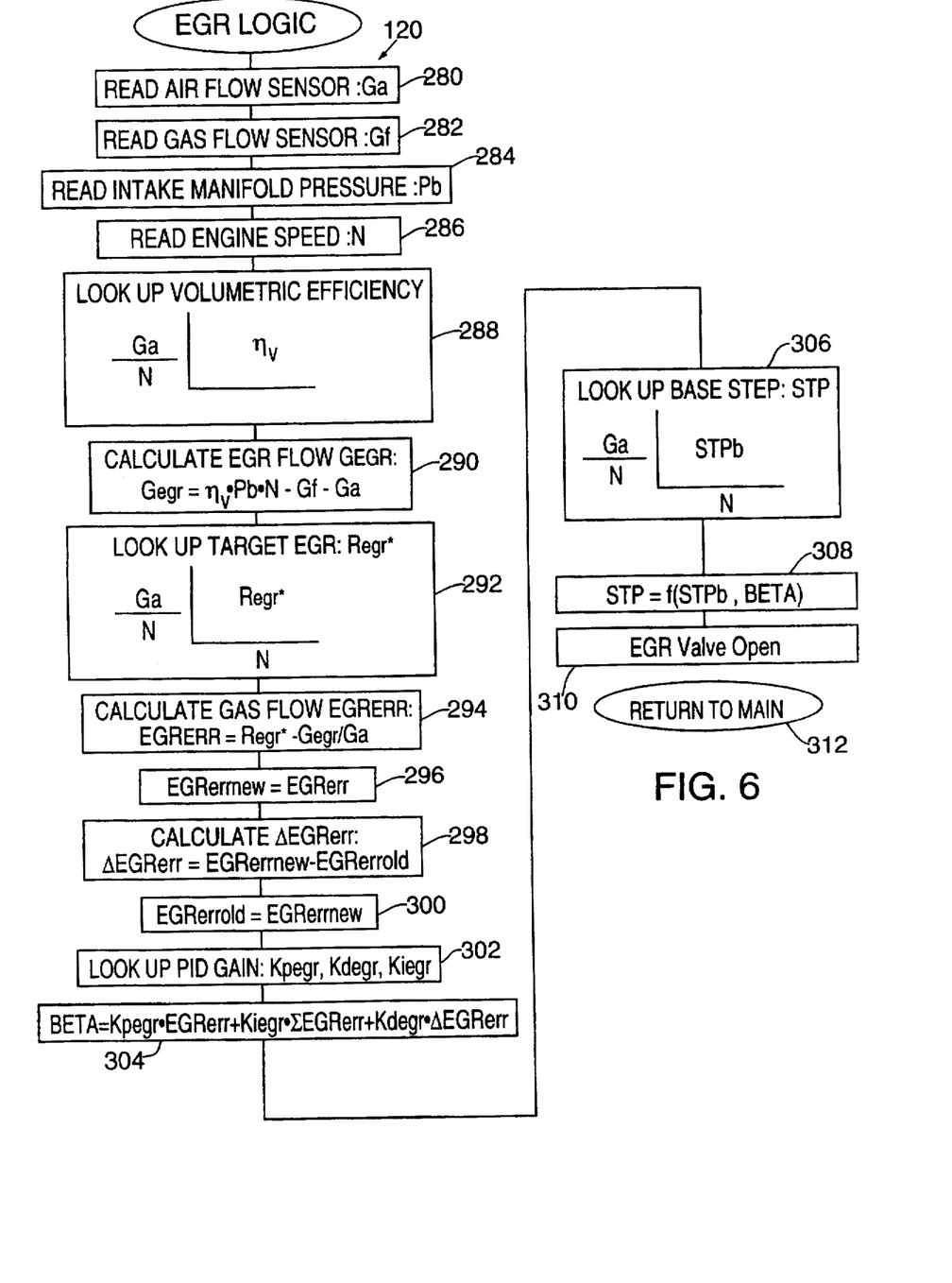
FIG. 6 is a flow chart illustrating the control strategy during an exhaust gas recirculation operating condition.

With reference now to FIG. 6 a flow chart illustrating the EGR logic 120 (FIG. 2) is there shown in greater detail. Once an EGR condition has been determined at step 118 (FIG. 2) the ECU first determines the mass air flow rate $G_a$ by reading the air flow sensor 72 at step 280. The gas flow rate $G_f$ is then determined by reading the value from the gas flow sensor 70 at step 282 and the intake pressure is then calculated at step 284 in accordance with the following equation:

$$P_b = f(G_a, G_f, N, EGR)$$

where EGR=percentage of EGR

Step 284 then branches to step 286 where the ECU 42 determines the engine speed N from the speed sensor 48 and then branches to step 288 where the volumetric efficiency $\eta_v$ is determined from a look up table as a function of the engine load $G_a/N$ and engine speed N.

The ECU then calculates the EGR flow $G_{egr}$ at step 290 as follows:

$$G_{egr} = \eta_v \times P_b \times N - G_f - G_a$$

Step 290 then branches to step 292 where the target value $R_{egr}^*$ for the exhaust gas recirculation is determined from the look up table as a function of engine load $G_a/N$ and engine speed N. The ECU 42 then calculates the exhaust gas flow error amount $EGR_{err}$ as follows:

$$EGR_{err} = R_{egr}^* - G_{egr}/G_a$$

and then stores the err signal $EGR_{err}$ as the new err signal $EGR_{errnew}$ at step 296.

The change in the EGR err signal $EGR_{err}$ is then calculated at step 298 as follows:

$$\Delta EGR_{err} = EGR_{errnew} - EGR_{errold}$$

The EGR then stores the new error signal as the old error signal at step 300 and then determines the PID gains for an EGR engine operating condition $K_{pegr}$, $K_{degr}$ and $K_{eigr}$ from look up tables in the previously described fashion at step 302. The correction signal BETA, i.e. the correction signal for the duty cycle of the pulse stream to the fuel control valve 66, is then determined at step 304 in accordance with the following formula:

$$BETA = K_{p_{egr}} \cdot EGR_{err} + K_{i_{egr}} \cdot \Sigma EGR_{err} + K_{d_{egr}} \cdot \Delta EGR_{err}$$

Conventionally, EGR valves open in a stepped function. Consequently, step 302 branches to step 306 which determines the step value for the EGR valve $STP_b$ as a function of engine load Ga/N and engine speed N. The actual step value STP is then determined at step 308 as a function of both BETA and the $STP_b$ value determined at step 306.

Step 308 then branches to step 310 which actuates the EGR valve. Finally, step 312 returns the program control to the main operating loop (FIG. 2).

Figure 7:
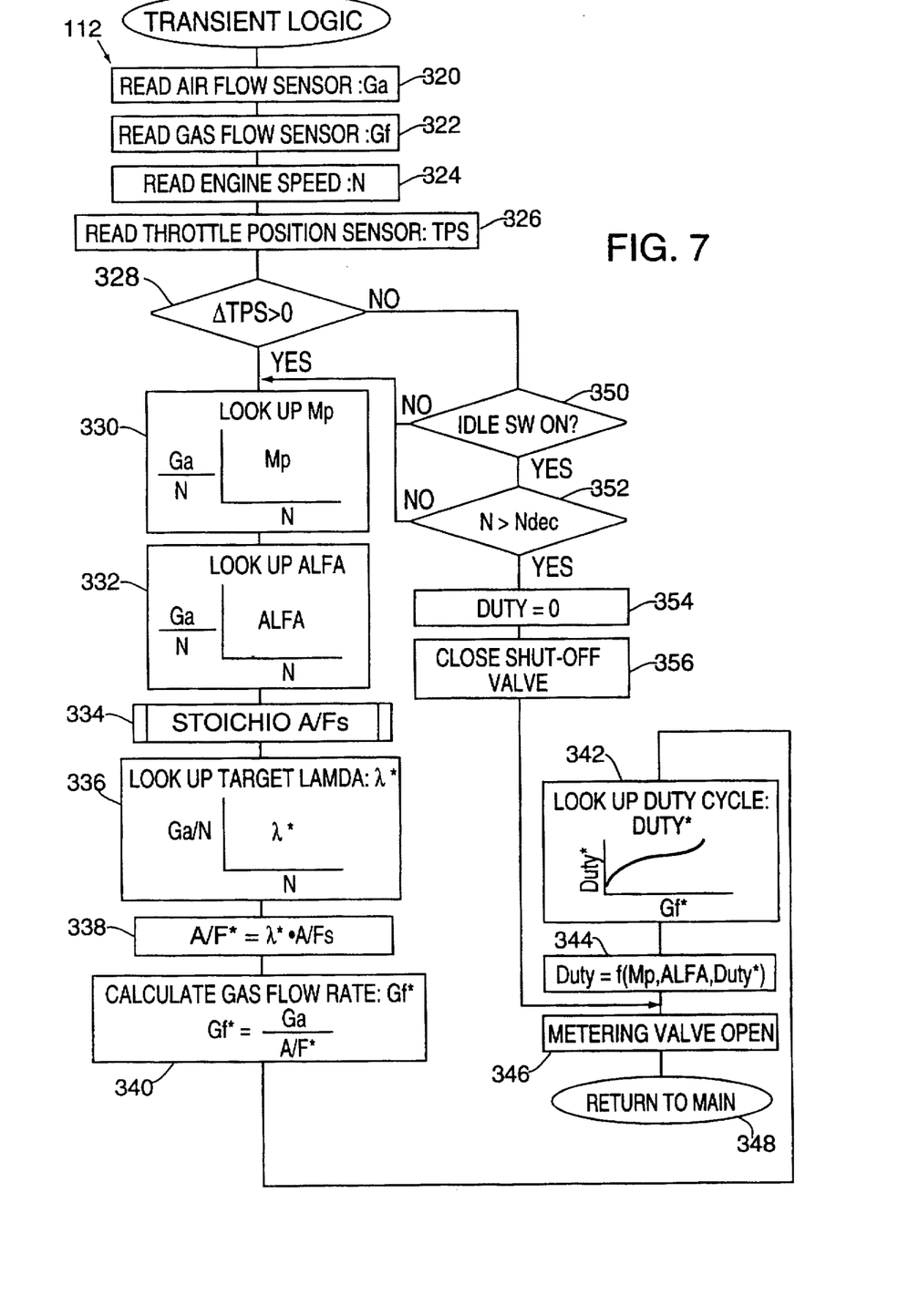
FIG. 7 is a flow chart illustrating the control strategy during a transient engine operating condition.

With reference now to FIG. 7 a flow chart is there illustrated which is executed whenever a transient engine operating condition, such as engine acceleration, is present. Whenever such an engine condition is present, step 110 branches to step 112 (FIG. 2) which is depicted more fully in FIG. 7.

At step 320, the air flow rate $G_a$ is determined by the ECU 42 by reading the signal from the mass air flow sensor 72. The ECU 42 then determines the gas flow rate $G_f$ at step 322 by reading the value from the gas flow sensor 70 as well as the engine speed N at step 324. The ECU also reads the throttle position sensor 54 at step 326 and stores this value in variable TPS.

At step 328, the ECU determines if there has been a change in the signal from the throttle position sensor TPS. If so, step 328 branches to step 330 where the proportional gain figure $M_p$ is determined from a look up table as a function of engine load $G_a/N$ and engine speed N. Similarly, the value of ALFA is also determined from a look up table at step 332 also as a function of engine load and engine speed.

At step 334, the ECU determines the stoichiometric value for the air/fuel ratio $A/F_s$ which is a constant for a given fuel type. The ECU then determines a target lambda $\lambda^*$ at step 336 as a function of engine load ($G_a/N$) and engine speed N and then multiplies the target lambda value $\lambda^*$ and stoichiometric air/fuel ratio $A/F_s$ to determine a target air/fuel ratio $A/F^*$ at step 338. The target gas flow rate $G_f^*$ is then calculated at step 340 in accordance with the following formula:

$$G_f^* = \frac{G_a}{A/F^*}$$

Step 340 then branches to step 342 which determines a target duty cycle Duty* as a function of the target gas flow rate $G_f^*$ from a look up table. Step 344 calculates the actual duty cycle Duty as a function of $M_p$, ALFA and the target duty cycle Duty* as follows:

$$Duty = f(M_p, Duty^*, ALFA)$$

where Duty * = target duty cycle

Following computation of the duty cycle at step 344, step 346 then varies the duty cycle of the pulse stream transmitted to the valve 66 by pulse width modulation to achieve the duty cycle Duty as determined at step 344. Step 346 then returns to the main program loop (FIG. 2) via step 348.

Assuming that the position of the throttle has not changed, step 328 instead branches to step 350 which determines if the idle switch is on. If not, step 350 branches to step 330. Otherwise, step 350 branches to step 352 which determines if the engine speed N is greater than a preset constant $N_{dec}$. If so, step 350 branches to step 354 which sets the duty cycle Duty to zero. Otherwise, step 352 branches back to step 330 and the previously described process is executed.

Assuming that the engine speed is greater than the predetermined amount $N_{dec}$, step 354 closes the shutoff valve at 356 which effectively eliminates fuel flow to the engine and then branches to step 346 and returns to the main program loop (FIG. 2) via step 348.

Steps 350–356 thus terminate fuel flow to the engine during a period of deceleration thereby conserving fuel. The complete elimination of fuel to the engine is permissible as long as the engine speed is greater than the predetermined constant $N_{dec}$ since, as soon as the engine speed reaches the value $N_{dec}$ or falls below it, the fuel supply is reestablished to the engine via step 352.

Figure 8:
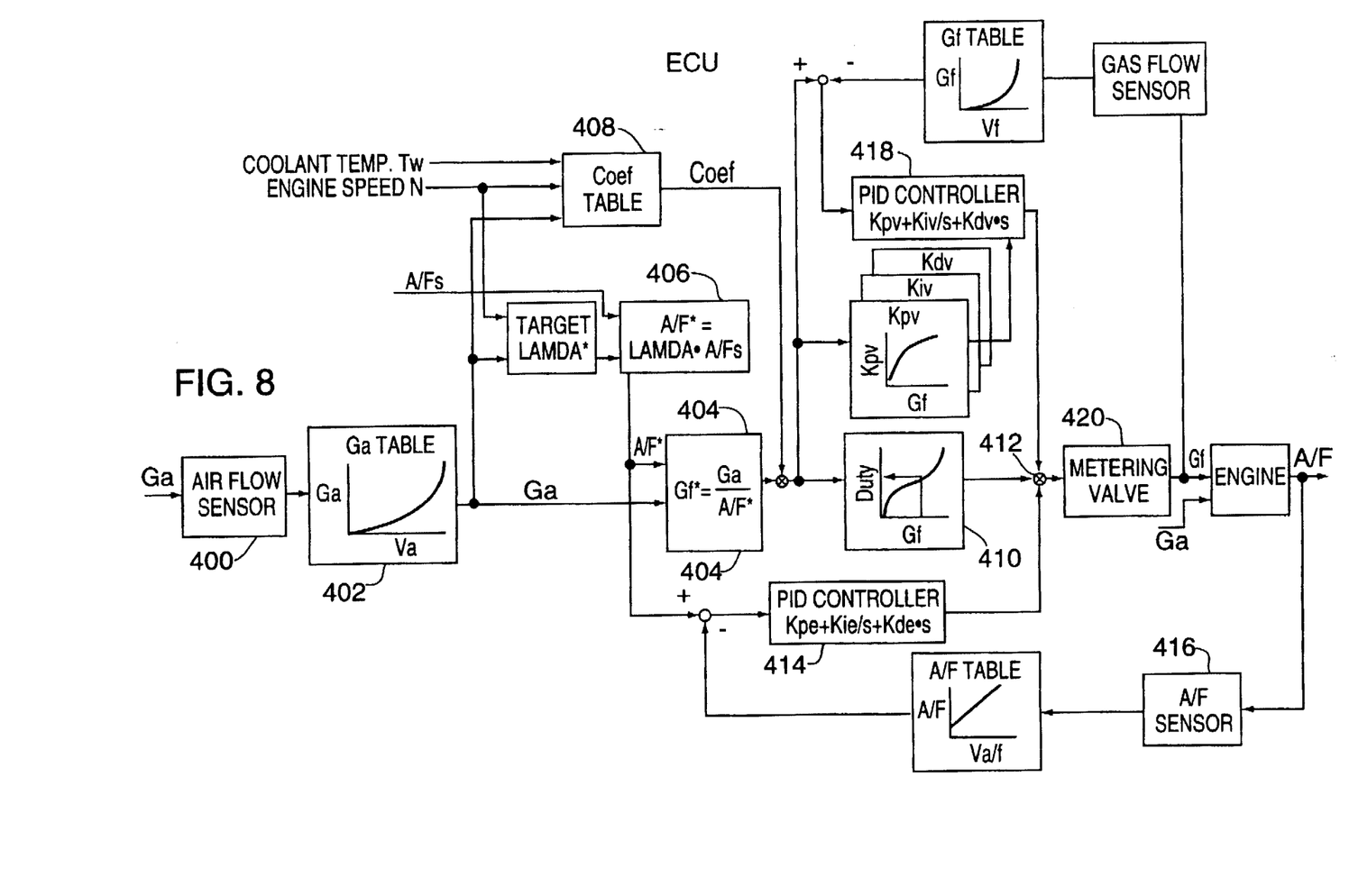
FIG. 8 is a diagrammatic view illustrating a preferred embodiment of the present invention.

With reference now to FIG. 8, the fuel control system of the present invention is there illustrated schematically in which the air flow rate $G_a$ is determined at block 400, corrected at block 402 and then coupled as an input signal to block 404 which determines the target gas flow rate $G_f^*$ as a function of the air flow rate $G_a$ provided by the target air/fuel ratio at block 404.

The target air/fuel ratio $A/F^*$ required by block 404 is determined by the value of the air/fuel ratio at stoichiometric $A/F_s$ which is multiplied by target lambda at block 406 and fed as an input signal to the block 404.

The output signal from block 404, i.e. the target gas flow rate $G_f^*$ is also corrected by any desirable constants from block 408. Various engine parameter inputs, such as coolant temperature $T_w$ and engine speed N are fed as input signals to block 408.

The target gas flow rate $G_f^*$, after correction by the coefficients from the block 408, is utilized to determine the duty cycle from a table at block 410. The output signal from block 410, i.e. the duty cycle of the pulse stream to actuate the fuel valve 66, is then fed to a summing junction 412.

The summing junction 412 also receives input signals from the PID gain controller at block 414 which represents the correction factor ALFA as a feedback signal from the air/fuel sensor 416.

Similarly, the summing junction 412 receives a correction signal $M_p$ from the PID gain controller 418 which represents the correction signal for the target flow rate of the gas flow to the engine.

The output signal from the summing junction 412 is utilized to actuate the fuel valve 66 at block 420 by pulse width modulation as a function not only of the duty cycle, but also the correction factors from the feedback signal from the air/fuel sensor as well as the gas flow sensor.

Figure 9:
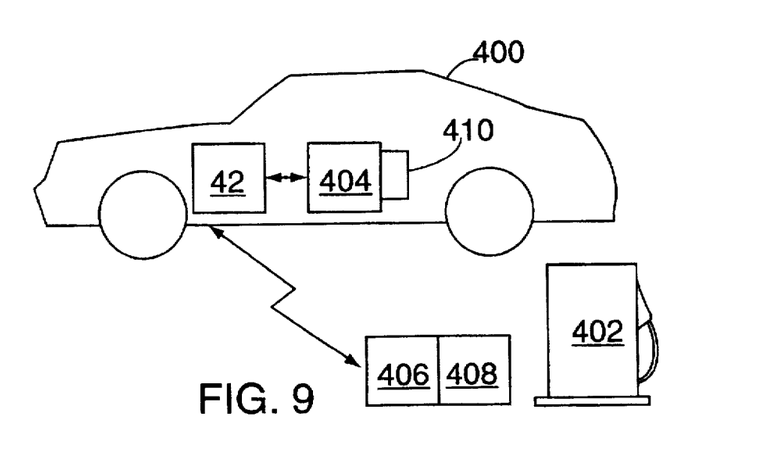
FIG. 9 is a diagrammatic view illustrating a further feature of the present invention.

With reference to FIG. 9, a vehicle 400 propelled by a gaseous fuel engine is thereshown at a refueling station 402. The vehicle 400 includes a transmitter 404 controlled by the ECU 42 which transmits engine maintenance, engine performance and other data in a preset format to a receiver 406 at the refueling station 402. The refueling station may also include a transmitter 408 which transmits data pertaining to fuel content, fuel price and other data to a receiver 410 in the vehicle 400. The data from the refueling station 402 as well as the vehicle 400 may also be transmitted by any conventional means, such as a modem, to a control station (not shown).

From the foregoing, it can be seen that the present invention provides a unique fuel control system for a gaseous fuel engine which allows accurate control of the fuel flow to the engine during all engine operating conditions.

Having described our invention, however, many modifications thereto will become apparent to those skilled in the art to which it pertains without deviation from the spirit of the invention as defined by the scope of the appended claims.

We claim:

1. For use with an internal combustion engine having at least one combustion cylinder, a source of gaseous fuel, an air intake and intake passageway means for fluidly connecting the air intake to the combustion cylinder, a control system comprising:

means for measuring fuel flow rate to the engine and for generating a fuel flow rate signal representative thereof, means for measuring air flow rate to the engine and for generating an air flow rate signal representative thereof, means for detecting an engine operating condition and for generating an engine operating condition signal representative thereof, a fuel valve fluidly connected in series between the gaseous fuel source and the intake passageway means, said valve being actuated to an open position in response to a predetermined electrical signal, means for generating a pulse stream of said predetermined electrical signal and for connecting said pulse stream to said valve, the amount of fuel supplied to the engine being proportional to a duty cycle of said pulse stream, means responsive to said engine operating condition signal, said fuel flow rate signal and said air flow rate signal for determining PID gain scheduling parameters relative to the duty cycle of said pulse stream necessary to obtain a target air/fuel ratio, and means for varying the duty cycle of said pulse stream as a function of said PID gain scheduling parameters.

2. The invention as defined in claim 1 and comprising means for determining the air/fuel ratio to the engine, means for comparing said air/fuel ratio to said target air/fuel ratio and for generating an air/fuel ratio error signal representative thereof, and means responsive to said air/fuel ratio error signal for varying the duty cycle of the pulse stream to reduce said air/fuel ratio error signal.

3. The invention as defined in claim 2 wherein said means to vary the duty cycle of the pulse stream to reduce said air/fuel ratio error signal comprises means for determining second PID gain scheduling parameters relative to the duty cycle of said pulse stream.

4. The invention as defined in claim 1 and comprising means for determining a target duty cycle for said pulse stream and wherein said duty cycle varying means comprises means to modify said target duty cycle as a function of said PID gain scheduling parameters.

5. The invention as defined in claim 4 and comprising a digital processor having access to digital memory and wherein said target duty cycle determining means comprises a look up table stored in said digital memory.

6. The invention as defined in claim 1 and comprising a digital processor having access to digital memory and wherein said target air/fuel ratio comprises a look up table stored in said digital memory.

7. The invention as defined in claim 1 and comprising means for determining pressure in the intake passageway means, and means for varying said PID gain scheduling parameters as a function of said pressure in the intake passageway means.

8. The invention as defined in claim 1 and comprising a digital processor having access to digital memory and wherein said PID gain scheduling parameters are contained in a look up table stored in said digital memory.

9. The invention as defined in claim 1 and comprising an idle speed bypass valve, means for detecting an idle speed condition, and means responsive to said means for detecting an idle speed condition for selectively actuating said idle speed bypass valve.

10. The invention as defined in claim 1 and comprising an exhaust gas recirculation valve, and means for selectively actuating said exhaust gas valve.

11. The invention as defined in claim 1 wherein said means for detecting an engine operating condition comprises means for detecting a plurality of different engine operating conditions, and wherein said PID gain scheduling parameters vary as a function of said engine operating conditions.

12. The invention as defined in claim 11 wherein said engine operating condition detecting means comprises an engine speed sensor.

13. The invention as defined in claim 11 wherein said engine operating condition detecting means comprises a throttle position sensor.

* * * * *